Nov. 4, 1952     M. W. PALSGROVE     2,616,241

DEVICE FOR CONNECTING AND DISCONNECTING CHAIN LINKS

Filed Jan. 19, 1949     2 SHEETS—SHEET 1

Inventor
Maurice W. Palsgrove

By *M. A. McDowell*

Attorney

Nov. 4, 1952     M. W. PALSGROVE     2,616,241
DEVICE FOR CONNECTING AND DISCONNECTING CHAIN LINKS
Filed Jan. 19, 1949     2 SHEETS—SHEET 2
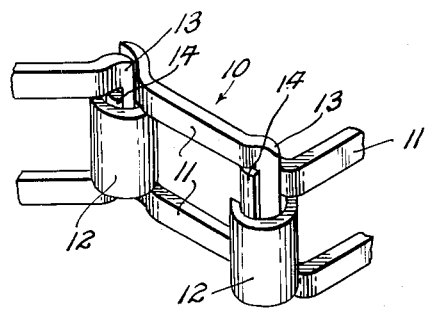
FIG. 5.
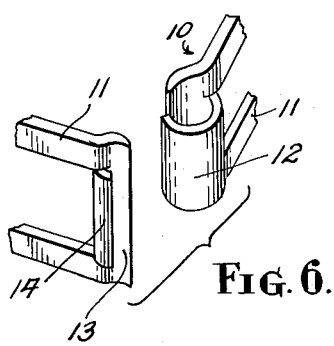
FIG. 6.
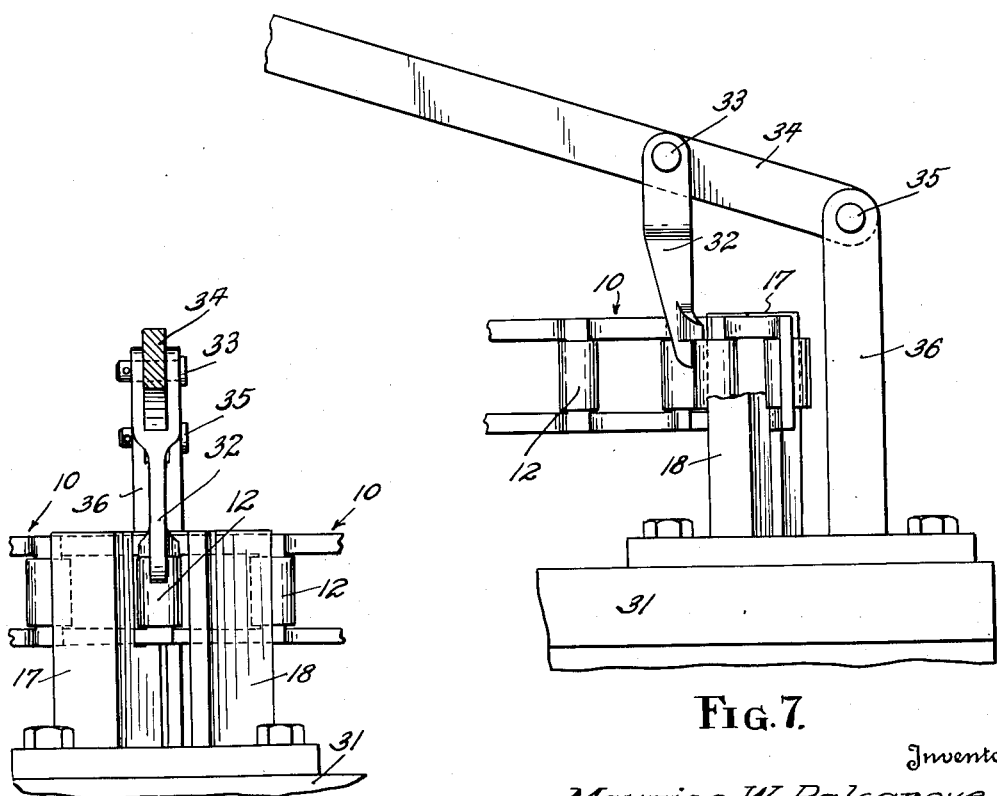
FIG. 7.
FIG. 8.
Inventor
Maurice W. Palsgrove
By W. S. McDowell
Attorney Patented Nov. 4, 1952

2,616,241

UNITED STATES PATENT OFFICE 2,616,241

DEVICE FOR CONNECTING AND DISCONNECTING CHAIN LINKS

Maurice W. Palsgrove, Canal Winchester, Ohio, assignor to Palsgrove Manufacturing Company, Canal Winchester, Ohio, a partnership Application January 19, 1949, Serial No. 71,656

1 Claim. (Cl. 59—7)

This invention relates to a device for facilitating the operations of uniting and/or separating chain links, particularly chains of the open-link type. Such chains are employed in the various drives of farm machinery, conveyors or the like.

Such chains are formed so that each of the links thereof is of substantially integral rectangular formation. Each link includes parallel side bars which are united at one end of the link by a transverse formation possessing the configuration of a split sleeve, while the other end of each link is formed to present an arcuate tongue carrying a laterally offset key, the tongue and key of each link being receivable within the complemental split sleeve formation of a next adjacent link, when connected links occupy predetermined angular positions, the latter constituting positions which the links do not normally occupy during their use and operation in their motion-transmitting capacities. Such chains do not employ separate transverse pins or studs. The uniting or separating of such links is a somewhat tedious and difficult operation to perform, since the links must assume a definite relative order or angularity and often the links tend to adhere to one another so that slidable separation of their interfitting parts is difficult to accomplish.

Accordingly, it is an object of the present invention to provide a device for connecting or disconnecting chain links of the character defined which may be readily applied to the links of a chain when the latter is positioned in its operative order on an associated machine, and to admit of the application of forces to the links to separate or unite the same in a convenient and labor-saving manner.

For a further understanding of the invention, reference is to be had to the following description and the accompanying drawings, wherein:

Fig. 5 is a detail perspective view disclosing the construction of the chain links to which the connecting and disconnecting device forming the present invention is particularly applicable;

Fig. 6 is a similar view disclosing the chain links of Fig. 5 in a separated state;

Fig. 7 is a fragmentary side elevational view of a modified form of my improved device showing a presser dog carried by a pivotally supported lever;

Fig. 8 is a front elevational view of the modified form of the device as shown in Fig. 7.

Figure 1:
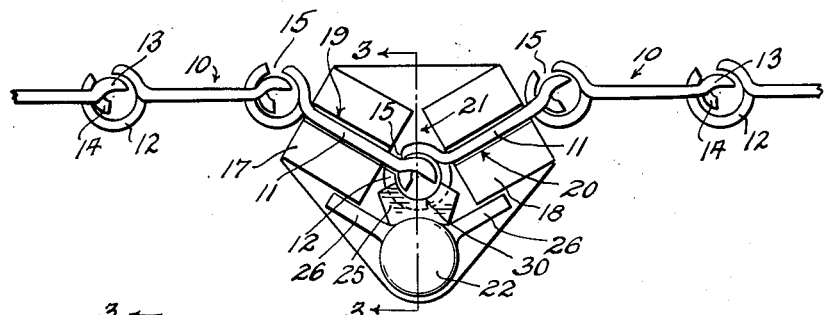
Fig. 1 is a top plan view of a chain link connecting and disconnecting device formed in accordance with the present invention.
Figure 2:
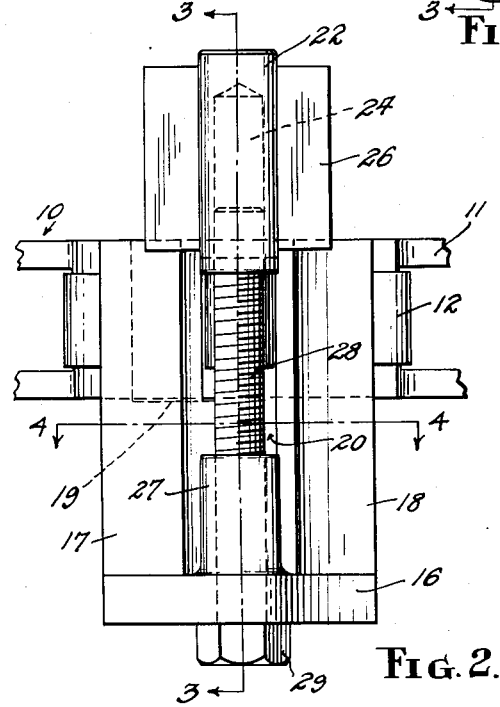
Fig. 2 is a front elevational view of the device.
Figure 3:
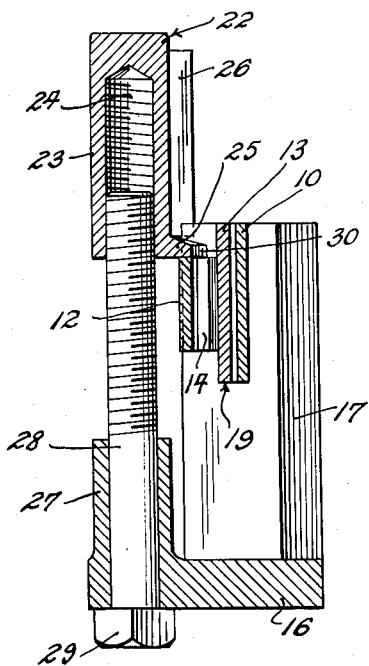
Fig. 3 is a vertical transverse sectional view taken through the device on the plane indicated by the lines 3—3 of Figs. 1 and 2.

Referring more particularly to the drawings, I have disclosed therein an open-link type of chain which is so widely used in the drives of agriculture machines, conveyors and the like. Such chains are formed to embody a plurality of wrought iron links, although cast steel may be used. Each link is of integral one-piece formation and is adapted to be articulately joined with adjacent links without the use of separate studs or pins.

To this end, each of the links shown at 10 is constructed to embody transversely spaced parallel side bars or reins 11. At one end, each link includes a transverse formation in the shape of a split sleeve 12, as shown more particularly in Figs. 1, 5 and 6. At its other end, each of the links is formed to embody a transversely extending arcuate tongue 13 and a cooperative laterally projecting key 14, all these parts of the link being of integral one-piece formation. As is well known, the purpose of this formation is to permit the links to be flexibly assembled in chain-forming order, so that while the chain is flexible for passage around the teeth of sprocket wheels or the like, nevertheless, the links are normally held against accidental separation and, to effect deliberate separation of said links, it is necessary that a pair thereof be held in a definite relatively integral order, as indicated in plan in Fig. 1, so that the side bars or reins 11 of one link may pass through the slot 15 provided in the sleeve formation 12 of the next adjacent link. When the links are normally assembled in active chain formation, the tongues 13 and keys 14 thereof engage with the inner cylindrical surfaces of the sleeve formations 12, providing an extended bearing area comparable to that of a pin or stud, and also forming a head which prevents separation of adjacent links when tensioning forces are applied thereto.

Figure 4:
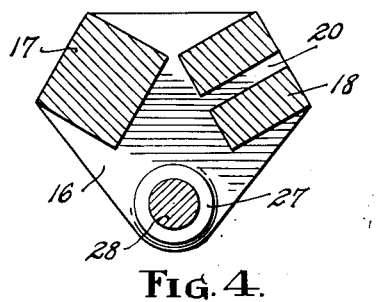
Fig. 4 is a horizontal sectional view on the line 4—4 of Fig. 2.

While such open-link chains are widely used because of their simplicity and economy, the same are difficult to assemble into chain-forming order or when being disassembled. The present invention provides means for facilitating such operations, and in the form thereof illustrated in Figs. 1 through 4, my improved chain connecting and disconnecting device includes a metallic block comprising a base 16 from which arises a pair of posts 17 and 18. As shown in Figs. 1 and 4, these posts are approximately square in transverse cross section, the post 17 being provided in the upper half thereof, with a link-receiving slot 19, while the post 18 is formed with a corresponding slot 20 but which differs from the slot 19 in that it is about twice the length of the latter, extending from approximately the plane of the base 16 to the upper end of the post. The slots 19 and 20 are arranged in definite angular order with respect to each other, as shown in Fig. 1, and the posts 17 and 18 are separated to provide a substantially triangular area 21 therebetween.

In the use of the apparatus, a pair of chain links to be separated are positioned in the guide slots 19 and 20, as indicated in Fig. 1, so that the interfitting sleeve and tongue formations 12 and 13 of these links will occupy the area 21 between the posts of the link-connecting and disconnecting block. With the links positioned as in Fig. 1, it will be seen that the side bars or reins 11 of one of the links are disposed in registration with the sleeve slot 15, permitting the link containing the sleeve slot so registered to be moved laterally with respect to the other link and thereby separated therefrom or connected therewith, as the case may be. Often such sliding movement offers difficulty and to permit of its ready accomplishment, the present invention provides a presser member indicated in its entirety by the numeral 22.

In the form of the invention shown in Figs. 1 through 4, this presser member comprises a metallic body 23 formed with an internally threaded socket 24. Exteriorly, the body is shaped to provide a presser foot 25 and on its opposite sides with widely diverging guide wings 26 arranged for engagement with the posts 17 and 18.

The base 16 of the device is formed with a bearing boss 27 for the rotatable reception of the unthreaded portion of the shank of a screw 28, the latter being formed with a headed end 29 arranged below the base 16 while the threaded portion of the shank of the screw is received in the socket 24 of the presser member.

By turning the screw through the application of a wrench or the like, not shown, to the headed end thereof, the presser member may be caused to move downwardly until the foot 25 thereof is in engagement with the upper edge of a link sleeve 12, and by reference to Fig. 1, it will be noted that the presser foot is formed with an arcuate recess 30 which conforms to the curvature of the inner surface of each link sleeve. Since the presser member cannot rotate by reason of the engagement of its wings 26 with the outer sides of the posts 17 and 18, the rotation of the screw 28 causes the presser member to travel downwardly, moving in unison with it the sleeve end of a link engaged thereby.

The link whose sleeve end is engaged by the presser foot is positioned in the slot 20 of the post 18, and since this slot is of greater length than the companion slot 19 in the post 17, it follows that the presser foot engaged link will travel downwardly throughout substantially the full height of the slot 20, whereas the link positioned in the slot 19 will be held or restrained against corresponding downward movement.

It will be apparent that the device illustrated in Figs. 1 through 4 is solid, strong and compact and may be readily applied to a chain operatively positioned on a machine. It is for this reason that the presser member is formed so that it may be operated by the turning of the screw. In other locations, such as in a shop, where more abundant space is provided, the device may be mounted on a work bench 31, and in lieu of employing a presser member operated by a screw, the presser member of Fig. 7 comprises a link 32 which is pivotally carried as at 33 on an operating arm or lever 34, the latter, in turn, being pivotally mounted as at 35 on the upper end of a post 36 forming a part of the device.

Thus, in either form of my improved device, ease and facility are provided in the matter of uniting or separating open-type integral chain links. The operations may be carried out quickly and without injury to the links operated upon. While I have set forth what I now consider to be certain preferred improvements of my invention, nevertheless, it will be appreciated that the constructions are subject to certain variations or modification without departing from the spirit and scope of the invention as the same have been defined in the following claim.

I claim:

A device for connecting and disconnecting adjoining drive chain links of the type formed with integral interlocking end formations which are separable only upon relative transverse movement thereof after positioning said links in fixed longitudinal angular relationship; said device comprising a frame; a pair of relatively spaced blocks mounted on said frame and formed with a pair of open angularly related slots for the lengthwise reception of a pair of adjoining chain links, said slots being of unequal depth and arranged to hold a pair of chain links in fixed longitudinal angular relation for relative transverse movement; a lever pivotally connected with said frame for swinging movement in a plane parallel to said blocks; and link-engaging pawl carried by said lever for engagement with one of a pair of links received in said slots and operable upon swinging movement of said lever to move one of such links transversely of the other link.

MAURICE W. PALSGROVE.

REFERENCES CITED

The following references are of record in the file of this patent:

UNITED STATES PATENTS

| Number | Name | Date |
|---|---|---|
| 1,806,682 | Heiny et al. | May 26, 1931 |
| 2,379,001 | Hage | June 26, 1945 |
| 2,397,513 | Smith | Apr. 2, 1946 |
| 2,467,279 | Vaupel | Apr. 12, 1949 |